Oct. 18, 1960 A. L. BERNSTEIN 2,957,145

TRANSISTOR PULSE GENERATOR

Filed Aug. 13, 1957

WITNESSES

Edwin E. Basler

Leon J. Taya

INVENTOR

Abraham L. Bernstein

BY J J Callahan

ATTORNEY

United States Patent Office 2,957,145

Patented Oct. 18, 1960

2,957,145

TRANSISTOR PULSE GENERATOR

Abraham L. Bernstein, Metuchen, N.J., assignor to Westinghouse Electric Corporation, East Pittsburgh, Pa., a corporation of Pennsylvania Filed Aug. 13, 1957, Ser. No. 678,012

2 Claims. (Cl. 331—112)

This invention relates generally to the generation and amplification of electrical pulses and, more particularly, to pulse generating and/or amplifying circuits employing transistors.

Generators of the blocking-oscillator type are known which are capable of producing pulse type signals. In the past it has been the practice to provide capacitors for the control of the recurrence or repetition rate of generators of this type. It has also been the general practice to provide for control of the pulse height or amplitude in a succeeding amplifying stage.

It is therefore an object of the present invention to provide a pulse generator which uses a resistor for the control of its repetition rate.

It is another object of the present invention to provide a pulse generator in which control of the pulse height is effected within the generator.

It is still another object of the present invention to provide a transistor pulse generator of the blocking-oscillator type in which the time constants of the feedback transformer are utilized for the control of the pulse repetition rate and for control of the pulse width.

It is a further object of the present invention to provide a novel pulse generator providing for control of the pulse repetition rate, pulse height, and pulse width within the generator itself.

Figure 1:
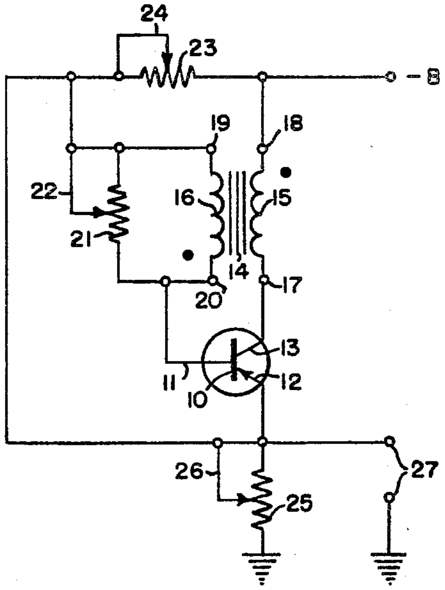
Figure 2:
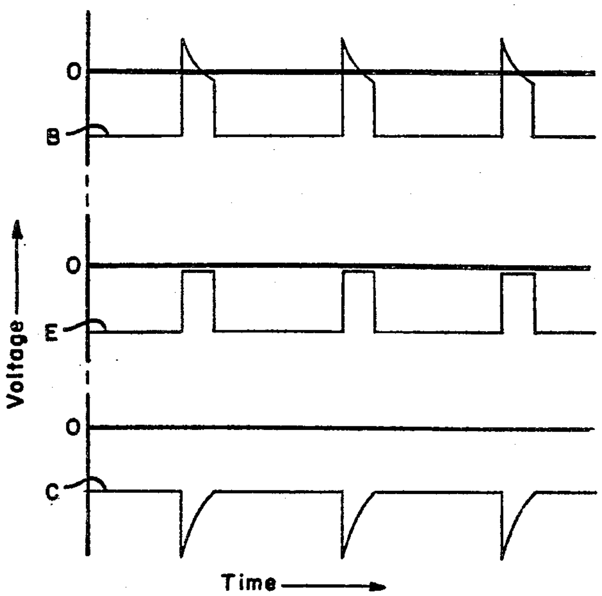

These and other objects are effected by my invention as will readily appear from a consideration of the following detailed description, taken in conjunction with the accompanying drawing, in which:

Figure 1 is a schematic circuit diagram of a preferred embodiment of the invention, and Fig. 2 is a graphical illustration representing the waveforms produced at various points in the circuit of Fig. 1.

Referring to Fig. 1 in detail, the circuit shown comprises a transistor 10 having base, emitter and collector electrodes 11, 12 and 13, respectively. A transformer 14 having a primary winding 15 and a secondary winding 16 is connected in such a manner as to provide a regenerative feedback path between the collector electrode 13 and the base electrode 11 of transistor 10. Primary winding 15 has two terminals 17 and 18 and secondary winding 16 likewise has two terminals 19 and 20. Connected between terminals 19 and 20 of transformer 14 is a resistor 21 which is made variable by means of the variable tap 22. Connected between terminals 18 and 19 is a further resistor 23 which is made variable by means of the variable tap 24. Terminal 17 is connected to the collector electrode 13 of transistor 10, terminal 20 is connected to the base electrode 11 of transistor 10, and terminal 19 is connected to the emitter electrode 12 of transistor 10. Connected between the emitter electrode 12 and a point of reference potential represented as ground is a resistor 25 which is made variable by means of the variable tap 26 and across which output terminals 27 are located. Terminal 18 is connected to a suitable source of operating potential —B which biases the collector electrode 13 in the usual manner, that is, in a non-conducting polarity with respect to the base electrode 11.

The transformer 14 is connected with the polarity of its windings 15 and 16 opposite, as indicated by dots, so that a positive-feedback signal is supplied to transistor 10 when conduction occurs.

In the following discussion of the operation of the circuit of Fig. 1, reference will be made to the waveforms of Fig. 2, wherein the abscissa represents time and the ordinate voltage; namely, the waveform B which is taken by measuring between the base electrode 11 and ground, waveform E which is taken by measuring between emitter electrode 12 and ground, and waveform C which is taken by measuring between collector electrode 13 and ground.

Assume at first transistor 10 is conducting. Since the circuit is highly regenerative, the transistor 10 is in a highly saturated condition and the emitter electrode 12 is approximately at the potential —B. When the current through the resistor 25 reaches a final value, the current through the primary winding 15 of transformer 14 approaches a constant value. The rate of change of current through the primary winding 15 of transformer 14 causes the potential of the secondary winding 16 to decrease toward zero value. This decrease of potential between the base electrode 11 and the emitter electrode 12 of transistor 10 causes a decrease of current through the emitter electrode 12 to collector electrode 13 circuit of the transistor. The regenerative action of the transformer 14 causes the transistor 10 to become non-conductive very rapidly. The potential of the emitter electrode 12 becomes the value that is determined by the voltage divider consisting of the resistors 23 and 25.

Since the base electrode 11 of transistor 10 is now biased in a reversed direction, very little current will flow in the base electrode 11—emitter electrode 12 circuit. The energy stored in the magnetic field of transformer 14 is dissipated in the resistor 21. When sufficient energy is dissipated, the potential across the resistor 21 is reduced to a low enough value to allow a leakage current to flow in the collector electrode 13 circuit of the transistor. This slight increase of current in the primary winding 15 of transformer 14 causes a base electrode current to flow in the abse electrode 11—emitter electrode 12 circuit which in turn increases the collector electrode 13 current. This regenerative action increases until the emitter electrode 12 is approximately at potential —B and the cycle is repeated.

In the circuit of Fig. 1, the resistor 25 controls the rate of current when transistor 10 is conducting; the resistors 23 and 25 control the amplitude of the emitter electrode 12 potential when the transistor 10 is in a non-conducting state; and the resistor 21 controls the rate of decay of the magnetic flux in the transformer 14 when the transistor 10 is in a non-conducting state. Therefore, the resistor 21 controls the pulse width; the resistors 23 and 25 control the pulse amplitude; and the resistor 25 controls the pulse repetition rate.

Although I have described my invention with particular reference to a specific embodiment thereof, numerous modifications will be apparent to those skilled in the art without departing from the spirit and scope of the invention.

I claim as my invention:

1. A pulse generator comprising a transistor having an emitter electrode, a collector electrode, and a base electrode, a source of operating potential connected to said transistor, a transformer intercoupling said collector electrode with said base electrode to provide a feedback path to cause regeneration, said transformer having a primary winding connected at one end to said collector electrode and a secondary winding connected at one end to said base electrode, a first variable resistance connected in parallel with said secondary winding to provide a variable pulse width control, a second variable resistance interconnecting the other ends of said primary winding and said secondary winding to provide a variable pulse amplitude control, direct current conductive means connecting said second variable resistance with said emitter electrode, and a third variable resistance connected between said emitter electrode and a voltage reference point to provide a variable pulse frequency control.

2. A pulse generator comprising a transistor having an emitter electrode, a collector electrode, and a base electrode, a source of operating potential connected to said transistor for negatively biasing said collector electrode with respect to said emitter electrode, a transformer intercoupling said collector electrode with said base electrode to provide a feedback path to cause regeneration, said transformer having a primary winding connected at one end to said collector electrode and a secondary winding connected at one end to said base electrode, a first variable resistance connected in parallel with said secondary winding to provide a variable pulse width control, a second variable resistance interconnecting the other ends of said primary winding and said secondary winding to provide a variable pulse amplitude control, direct current conductive means connecting said second variable resistance with said emitter electrode, and an output circuit coupled with said emitter electrode.

References Cited in the file of this patent

UNITED STATES PATENTS

| | | |
|---|---|---|
| 2,396,439 | Schlesinger | Mar. 12, 1946 |
| 2,847,569 | Finkelstein | Aug. 12, 1958 |
| 2,848,613 | Green et al | Aug. 19, 1958 |